US011255357B2

(12) United States Patent
Yoshimi

(10) Patent No.: US 11,255,357 B2
(45) Date of Patent: Feb. 22, 2022

(54) CYLINDER

(71) Applicant: KOSMEK LTD., Kobe (JP)

(72) Inventor: Masahiro Yoshimi, Kobe (JP)

(73) Assignee: KOSMEK LTD.

( * ) Notice: Subject to any disclaimer, the term of this patent is extended or adjusted under 35 U.S.C. 154(b) by 0 days.

(21) Appl. No.: 15/734,242

(22) PCT Filed: May 20, 2019

(86) PCT No.: PCT/JP2019/019828
§ 371 (c)(1),
(2) Date: Dec. 2, 2020

(87) PCT Pub. No.: WO2019/239779
PCT Pub. Date: Dec. 19, 2019

(65) Prior Publication Data
US 2021/0164498 A1 Jun. 3, 2021

(30) Foreign Application Priority Data

Jun. 12, 2018 (JP) .............................. JP2018-111564
Oct. 16, 2018 (JP) .............................. JP2018-195181

(51) Int. Cl.
*F15B 15/28* (2006.01)
*B23Q 3/06* (2006.01)
(Continued)

(52) U.S. Cl.
CPC ................ *F15B 15/28* (2013.01); *B23Q 3/06* (2013.01); *B23Q 3/082* (2013.01); *B23Q 17/00* (2013.01);
(Continued)

(58) Field of Classification Search
CPC ......... B25B 5/062; B25B 5/061; B23Q 3/082; B23Q 17/00; B60T 11/21; F15B 15/28
See application file for complete search history.

(56) References Cited

U.S. PATENT DOCUMENTS 9,789,588 B2 * 10/2017 Kawakami ............ F15B 15/063
2003/0151183 A1 * 8/2003 Yokota ................. B23Q 17/006
269/25
2013/0113146 A1 * 5/2013 Kawakami ............ B23Q 1/009
269/25

FOREIGN PATENT DOCUMENTS

EP 0173169 3/1986
EP 1336452 8/2003
(Continued)

OTHER PUBLICATIONS

International Search Report dated Aug. 6, 2019 issued in International Application No. PCT/JP2019/019828 (2 pages).

*Primary Examiner* — Abiy Teka
(74) *Attorney, Agent, or Firm* — Merek, Blackmon & Voorhees, LLC

(57) ABSTRACT

The present invention makes a rotary movement smooth, the rotary movement allowing direct detection of the movement of an output member of a rotary clamp. In a clamp, an output member is accommodated in a cylinder hole. A first valve chamber, to which compressed air is supplied, is provided between a lower wall of a housing and the output member. A second valve chamber is a hollowed out portion of the output member so as to be provided open toward the first valve chamber. A valve rod is inserted into the second valve chamber from the lower wall. A valve rod passage that allows the second valve chamber to communicate with outside air is provided in the valve rod, and a seal section is provided in a peripheral gap where the valve rod and the second valve chamber move relatively to one another. The gap is formed so that, as the valve rod and the second valve chamber are in relative movement, there is a region which is sealed by the seal section against movement of the compressed air through the gap between the valve rod and (Continued)

the second seal chamber and the there is a region which is open from the seal.

6 Claims, 11 Drawing Sheets

(51) Int. Cl.
  *B23Q 3/08* (2006.01)
  *B23Q 17/00* (2006.01)
  *F15B 15/06* (2006.01)
  *F15B 15/14* (2006.01)
  *F16H 25/12* (2006.01)

(52) U.S. Cl.
  CPC ............ *F15B 15/068* (2013.01); *F15B 15/14* (2013.01); *F15B 15/1466* (2013.01); *B23Q 2703/04* (2013.01); *F15B 15/2838* (2013.01); *F15B 2211/6306* (2013.01); *F16H 25/12* (2013.01)

(56) References Cited

FOREIGN PATENT DOCUMENTS

| | | |
|---|---|---|
| EP | 3255655 | 12/2017 |
| JP | 9280211 | 10/1997 |
| JP | 2003-305626 | 10/2003 |
| JP | 2007-268625 | 10/2007 |
| JP | 2012-166276 | 9/2012 |
| JP | 2014-108490 | 6/2014 |
| JP | 2015-20221 | 2/2015 |

* cited by examiner

CYLINDER

FIELD OF THE INVENTION

The present invention relates to a cylinder, and more particularly to a cylinder to be applied to a clamp that fixes a clamp object, i.e., an object to be clamped or fixed by the clamp.

For example, patent literatures 1 and 2 respectively disclose a rotary clamp that fixes a clamp object by turning and lowering a clamp arm. In the rotary clamp, a clamp rod (output member) provided with the clamp arm is inserted in a housing so as to be movable in a vertical direction and so as to be rotatable around an axis. The rotary clamp is provided with a motion detection device that detects an operation of the clamp rod. In the rotary clamp of patent literature 1, the position of the clamp rod is detected by integrally attaching an operation unit to one end part of the clamp rod and by opening and closing inlet holes for providing a pressurized or pressure fluid supply (a fluid supply provided under pressure) at different positions in the vertical direction. In patent literature 2, the up and down movement of the clamp rod is once converted into movement in a radial direction by the engaging ball, and further, a structure that converts the radial movement of the engaging ball into the up and down movement of a valve body is provided at the one end part of the clamp rod. The valve body opens and closes an opening of a pressurized air passage provided toward the vertical direction.

PRIOR ART

Patent Literature

Patent literature 1: Japanese Patent Laid Open Publication No. 2003-305626
Patent literature 2: Japanese Patent Laid Open Publication No. 2015-20221

DISCLOSURE OF THE INVENTION

Problems to be Solved by the Invention

In the motion detection device of the patent document 1, when the operation unit opens and closes the inlet hole, the operation unit slides around the periphery of the opening of the inlet hole, so that prolonged use may affect the performance of closing the inlet hole. On the other hand, in the motion detection device of the patent document 2, the opening of the pressurized air passage can be opened and closed by the up and down movement of the valve body without sliding as in the patent document 1. However, the valve body is not integrated with the clamp rod, and a mechanical element that transmits the movement of the clamp rod intervenes in the middle, so that there is a problem that it does not necessarily detect the movement of the clamp rod itself. For example, in the patent literature 2, when the valve body causes malfunction due to breakage of the valve body or the like, even if the clamp rod operates normally, it is erroneously detected that the valve body is abnormal.

The aim of the present invention is to directly and accurately detect the movement of the output member itself of the rotary clamp.

Means to Solve the Problem

In the present invention, a cylinder having an output member that is moved up and down by a pressure fluid (a fluid under pressure) is accommodated in a cylinder hole provided in a housing of the cylinder. The cylinder includes a first valve chamber provided between a lower wall of the housing and the output member, a second valve chamber which is formed by a hollowed out portion of the output member and the second valve chamber is open to the first valve chamber side, and a valve rod protruding from the lower wall to be inserted into the second valve chamber. The valve rod is provided with a valve rod passage open to or towards the second valve chamber. Between the valve rod and the second valve chamber, a seal section is provided on an outer peripheral wall side of the valve rod or on an inner peripheral wall side of the second valve chamber. When the valve rod and the second valve chamber move relative to each other, a compressed air flow passage formed between the first valve chamber and the second valve chamber is configured so as to have a closed region sealed by the seal section and an open region opened from the seal, i.e., the open region is free of sealing by the seal section so that the open region is not sealed or closed by the sealing section. Compressed air is supplied from one end of the compressed air flow passage, and the other end of the compressed air flow passage is opened to the outside air.

Effects of Invention

The motion detection device used in the present invention is configured to avoid sliding on the inlet hole as much as possible although the point that the operation unit is integrally provided to one end part of the output member or clamp rod is the same as that shown in the patent literature 1. Therefore, when the motion detection device is used for a long period of time, it is possible to reduce wear on the outer peripheral wall of the operation unit or the inner peripheral wall of the inlet hole, and the size of the sliding gap formed between the operation unit and the inlet hole can be maintained for a long time. Thus, the movement of the clamp rod can be accurately detected. In addition, in that the operation unit directly opens and closes the valve, the movement of the output member can be detected without interposing the mechanical element for transmitting the movement of the clamp rod as disclosed in the patent literature 2 in the middle.

BRIEF DESCRIPTION OF THE DRAWINGS

FIGS. 4A to 4D show a second embodiment of the present invention, FIG. 4A shows an unclamp state, FIG. 4B shows an intermediate state, and FIG. 4C shows a cross-sectional view of a clamp device in the clamp state.

FIG. 5A shows an unclamp state, FIG. 5B shows an intermediate state, and FIG. 5C shows a cross-sectional view of a clamp device in the clamp state.

FIG. 6A shows an unclamp state, FIG. 6B shows an intermediate state, and FIG. 6C shows a cross-sectional view of a clamp device in the clamp state.

FIG. 7A shows an unclamp state, FIG. 7B shows an intermediate state, and FIG. 7C shows a cross-sectional view of a clamp device in the clamp state.

FIG. 8A shows an unclamp state, FIG. 8B shows an intermediate state, and FIG. 8C shows a cross-sectional view of a clamp device in the clamp state.

FIG. 10A shows an upward advancing state, FIG. 10B shows an intermediate state, and FIG. 10C shows a cross-sectional view of the cylinder device in a descending and retreating state.

FIG. 11A shows an unclamp state, and FIG. 11B shows a cross-sectional view of a clamp device in the clamp state.

PREFERRED EMBODIMENTS OF THE INVENTION

Figure 1:
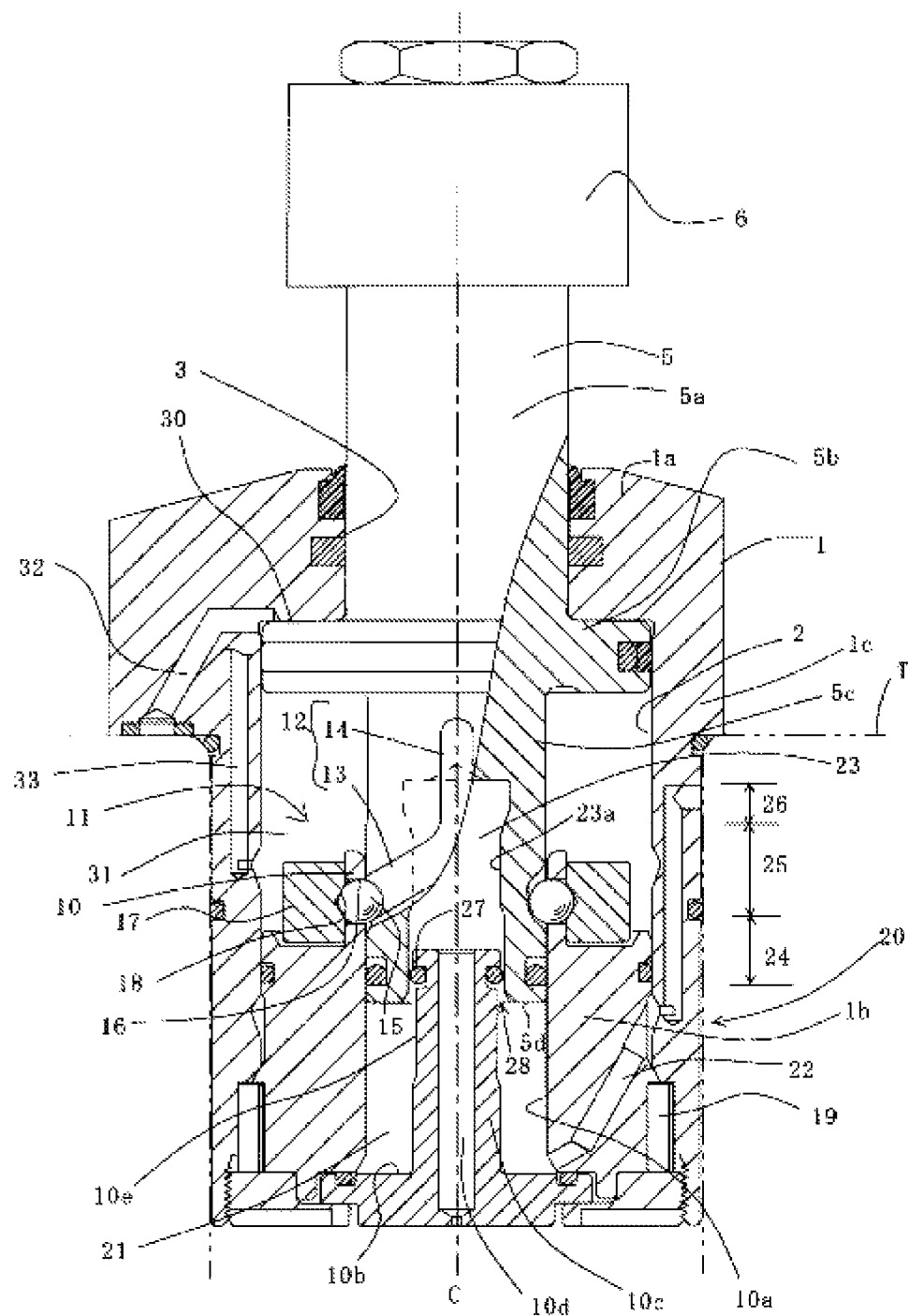
FIG. 1 is a cross-sectional view (unclamping state) of a rotary clamp according to a first embodiment of the present invention.

The present invention includes a first valve chamber provided on or adjacent a lower side of an output member, a second valve chamber formed by a hollowed out portion of the output member and the second chamber being open to a first valve chamber side along an axis, and a valve rod protruding from a lower wall of the first valve chamber to be inserted into the second valve chamber. The valve rod is provided with a valve rod passage having one end opened to the second valve chamber. The valve rod and the second valve chamber are relatively moved by the up and down movement of the output member. In this way, a compressed air flow passage through which compressed air passes is formed between the first valve chamber and a valve rod passage. The compressed air is supplied to one end side (the first valve chamber or the valve rod passage) of the compressed air flow passage, and is discharged to the outside air from the other end side (the valve rod passage or the first valve chamber) of the compressed air flow passage. A seal section for closing the movement of the compressed air through the compressed air flow passage is provided between the valve rod and the second valve chamber. A gap between the valve rod and the second valve chamber is formed so that there exists a closed region sealed by the seal section and an open region released or free from the seal of the seal section when the valve rod and the second valve chamber move relative to each other. In this embodiment, the compressed air flow passage is composed of the gap.

In the open region released or free from the seal of the seal section, a region area or segment having a different cross-sectional area of the gap may be provided so as to generate a different pressure loss when the compressed air passes between the valve rod and the second valve chamber during a movement process when the valve rod and the second valve chamber move relative to each other.

A bypass passage leading from the first valve chamber to the valve rod passage is provided on or in the closed region to be sealed, and a predetermined pressure loss by the bypass passage may be generated in the regions, areas or segments above and below the position where the bypass passage is provided.

When referring to "up" or "down" in this specification, it does not indicate a direction of gravity, the direction in which the output member is drawn or moved into the housing is referred to as "down", and the direction in which the output member is pulled out of the housing is referred to as "up". Hence, "up" and "down" include, for example, horizontal movement, vertical movement and angular movement between horizontal and vertical movement.

First Embodiment

The first embodiment will be described with reference to FIGS. 1 to 3.

First, the overall structure of the rotary clamp will be described with reference to FIG. 1. A housing 1 is fixed to a table T as a fixing base by a plurality of bolts (not shown). The housing 1 includes an upper wall (a distal wall) 1a, a lower wall (a proximal wall) 1b, a barrel wall 1c extending in a vertical direction, and a cylinder hole 2 formed inside the barrel wall 1c.

A part of an output member 5 penetrates or extends outside the housing 1 through a cylindrical hole 3 formed in the upper wall 1a of the housing 1. The output member 5 is hermetically inserted into the cylindrical hole 3 so as to be rotatable around an axis C and so as to be movable in the vertical direction (the direction of the axis C). An arm 6 is fixed to an upper end portion of the output member 5.

The output member 5 includes a rod body 5a, a piston portion 5b having a larger diameter than the rod body 5a, and a lower rod 5c, which are formed in order from the upper side. The lower rod 5c is slidably inserted into a cylindrical hole (bottomed insertion hole) 10a of a support cylinder 10 that forms a part of the lower wall 1b of the housing 1.

A rotary mechanism 11 is provided between the lower rod 5c of the output member 5 and the upper part of the inner wall of the cylindrical hole 10a of the support cylinder 10. The rotary mechanism 11 includes a guide groove 12 and a ball (engaging tool) 15. The guide groove 12 is formed by connecting a spiral rotary groove 13 and a rectilinear groove 14 extending upward. The ball 15 is inserted into the guide groove 12. The ball 15 is rotatably supported by a support hole 16 provided on the inner wall of the support cylinder 10. A sleeve 17 is rotatably fitted around the axis. A V-shaped groove 18 is formed on the inner peripheral surface of the sleeve 17, and the ball 15 can roll at two points above and below the V-shaped groove 18.

The support cylinder 10 is prevented from rotating around the barrel wall 1c of the housing 1 through a positioning pin 19 extending in the vertical direction to adjust the circumferential position (phase) of the output member 5 with respect to the housing 1.

A clamp chamber 30 is provided between the piston portion 5b and the upper wall 1a of the housing 1. An unclamp chamber 31 is provided between the piston portion 5b and the lower wall 1b of the housing 1. Pressure fluid for clamping (pressurized oil, compressed air, etc.) is supplied to and discharged from the clamp chamber 30 through a supply/discharge path 32 formed in the upper wall 1a of the housing 1. Further, pressure fluid for unclamping is supplied to and discharged from the unclamp chamber 31 through another supply/discharge path 33 formed in the barrel wall 1c of the housing 1.

The rotary clamp illustrated in FIG. 1 is in an unclamp state. The pressure fluid is discharged from the clamp chamber 30, and the pressure fluid is supplied to the unclamp chamber 31 through the supply/discharge path 33. The output member 5 is at the upper limit position. When switching to the clamp state, the pressure fluid is discharged from the unclamp chamber 31 through the supply/discharge path 33, and the pressure fluid is supplied to the clamp chamber 30 through the supply/discharge path 32. When the piston portion 5b moves downward, the output member 5 descends while being turned clockwise in plane view along the rotary groove 13. Subsequently, the output member 5 descends straight along the straight groove 14 to be in a clamp state. When switching the rotary clamp from the clamp state to the unclamp state, if the pressure fluid in the clamp chamber 30 is discharged and the pressure fluid is supplied to the unclamp chamber 31, the output member 5 rises straight and then turns.

The lower wall 1b is provided with a cylindrical hole 10a into which the lower rod 5c constituting the lower side of the output member 5 is inserted. The cylindrical hole 10a is a bottom or lower hole having a bottom 10b. A motion detection device 20 includes a first valve chamber 21 provided between the bottom 10b of the cylindrical hole 10a and the undersurface or lowermost surface 5d of the lower rod 5c, and a housing passage 22 provided on the lower wall 1b and supplying compressed air to the first valve chamber 21, a second valve chamber 23 having the lower rod 5c hollowed open downward along the axis C, a valve rod 10c protruding from the bottom 10b to be inserted into the second valve chamber 23, and a valve rod passage 10d leading the second valve chamber 23 to the outside air by penetrating through a top section of the valve rod 10c toward the second valve chamber 23. It is desirable that the opening installation position of the housing passage 22 that opens to the first valve chamber 21 is a position that does not interfere with the operation of the lower rod 5c. As described above, in the present embodiment, one end of the compressed air flow passage formed between the first valve chamber 21 and the valve rod passage 10d is on the first valve chamber 21 side.

The second valve chamber 23 can be divided into a first region 24, a second region 25, and a third region 26 in order from bottom to top depending on the inner diameter of the inner peripheral wall 23a. The second region 25 has the smallest diameter, and the third region 26 has the largest diameter. The first region 24 has a diameter between the diameter of second region 25 and the diameter of third region 26. A seal section (O-ring) 27 is provided around the top section of the valve rod 10c. When the valve rod 10c and the second valve chamber 23 move relative to each other along the axis C, a gap (the cross-sectional area of the gap around the axis C, hereinafter simply referred to as "gap") between the outer peripheral wall 10e of the valve rod 10c at the position of the seal section 27 and the inner peripheral wall 23a of the second valve chamber 23 is changed. The outer peripheral side of the seal section 27 with respect to the axis C slightly protrudes radially outward from the outer peripheral wall 10e of the valve rod 10c. In the first region 24, the seal section 27 is slightly separated from the inner peripheral wall 23a of the second valve chamber 23. In the second region 25, the seal section 27 is in contact with the inner peripheral wall 23a of the second valve chamber 23, and an effect of sealing the compressed air is exhibited (validated). In the third region 26, the seal section 27 is separated from the inner peripheral wall 23a of the second valve chamber 23. On the other hand, in the first region 24 and the third region 26, an effect of the seal section 27 for sealing the compressed air is invalidate& i.e., when seal section 27 is in first region 24 and third region 26, seal section 27 does not seal (free of sealing) the compressed air flow passage.

Next, the operation of the motion detection device 20 will be described. The compressed air supplied from the housing passage 22 is guided into the first valve chamber 21. In the unclamp state in FIG. 1, a throttle passage (referred to as "throttle passage 28") is formed between the seal section 27 in the first region 24 and the second valve chamber 23, and the compressed air of the first valve chamber 21 is guided to the valve rod passage 10d through the throttle passage 28. The throttle passage 28 forms a portion of the compressed air flow passage.

Figure 2:
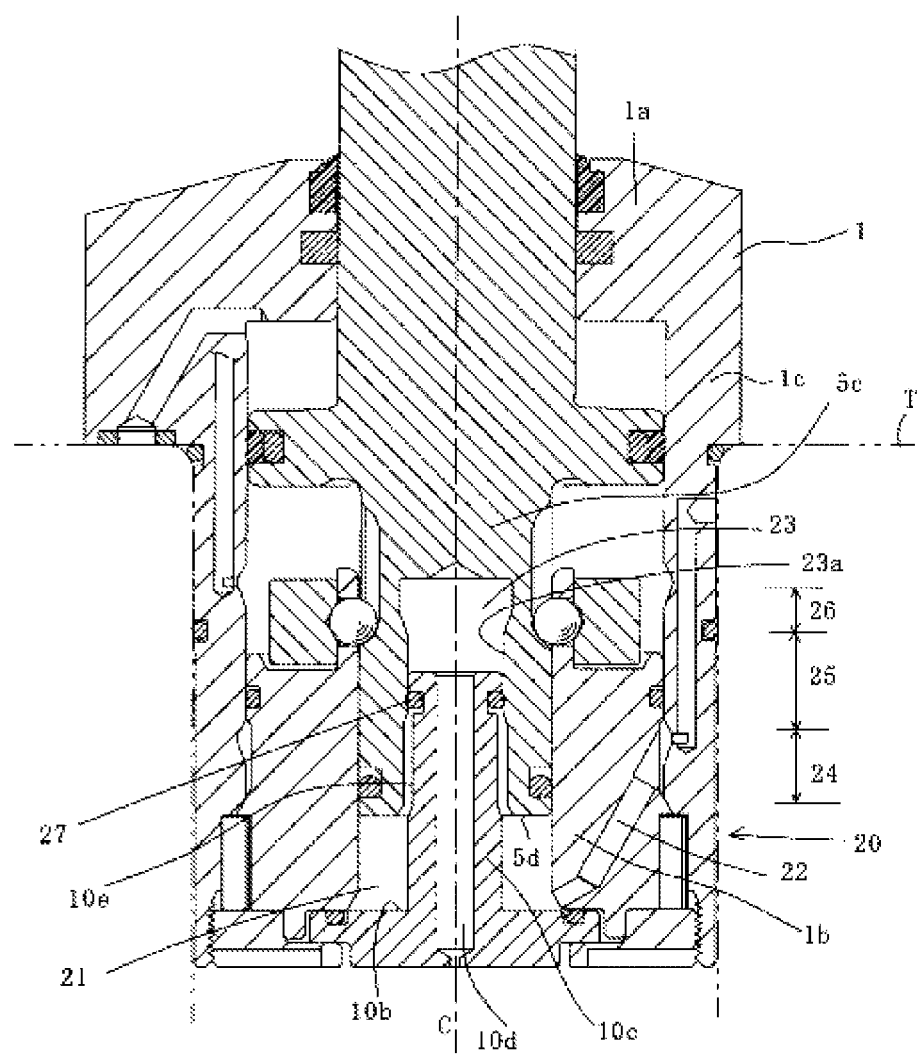
FIG. 2 is a partial cross-sectional view of the rotary clamp shown in FIG. 1 (an intermediate state between an unclamp state and a clamp state).

FIG. 2 shows the rotary clamp at the time of transition between the unclamp state to the clamp state. When the lower rod 5c descends and the seal section 27 reaches the second region 25, the flow passage between the first valve chamber 21 and the valve rod passage 10d is shut off or closed.

Figure 3:
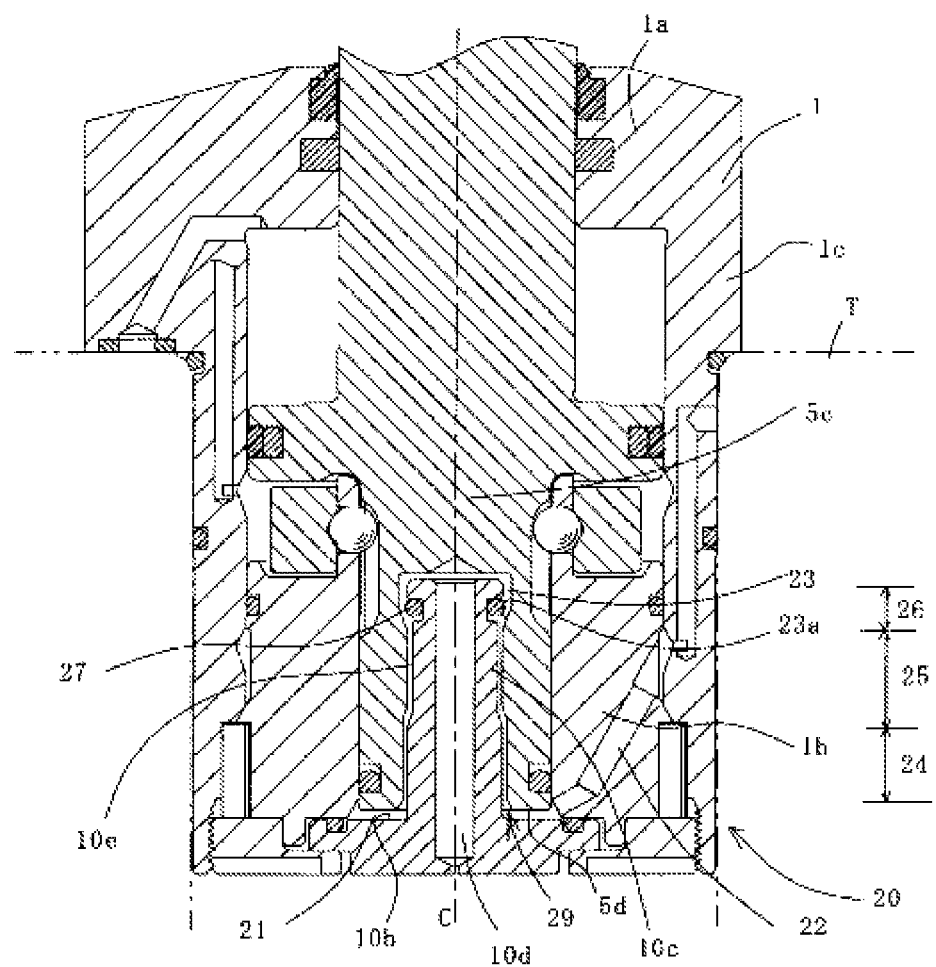
FIG. 3 is a partial cross-sectional view (clamp state) of the rotary clamp shown in FIG. 1.

In the clamp state shown in FIG. 3, the lower rod 5c further descends, and the seal section 27 reaches the third region 26. At this time, a flow passage 29 is formed between the seal section 27 and the second valve chamber 23, and the compressed air in the housing passage 22 is discharged outside through the flow passage 29 and the valve rod passage 10d. The cross-sectional area of the gap through which the compressed air passes differs between the throttle passage 28 and the flow passage 29, and the cross-sectional area of the flow passage 29 is larger than that of the throttle passage 28. Therefore, the pressure loss from the housing passage 22 to the valve rod passage 10d is different between the case where the gas flows through the throttle passage 28 and the case where the gas flows through the flow passage 29. In the present embodiment, in case of detecting by providing a pressure sensor (not shown) for the housing passage 22, the detection pressure when the seal section 27 is present in the second region 25 is 0.2 MPa, the pressure is 0.15 MPa in the unclamp state of the first region 24 and 0.0 MPa in the clamp state of the third region 26 (back pressure is atmospheric pressure). The position of the output member 5 can be detected by detecting the pressure with the pressure sensor.

In the present embodiment, the second region 25 in which the second valve chamber 23 contacts the seal section 27 is provided in the middle, so that the detection value of the pressure sensor can be greatly changed when the seal section 27 moves from the first region 24 to the second region 25 or from the second region 25 to the third region 26. In addition, since the second valve chamber 23 has no opening in the middle of the height and the seal section 27 does not slide through such an opening, so that the seal section 27 has little effect on the sealing performance. Further, since the seal section 27 is in contact with the inner peripheral wall 23a of the second valve chamber 23 only when the clamp state is changed, and is present in the first region 24 or the third region 26 during most of the normal time and not in a state of being compressed and deformed, the deterioration of the seal performance is small. In the first region 24, the output member 5 turns around the axis C. At this time, since the seal section 27 is separated from the valve rod 10c, wear and breakage of the seal section 27 due to the rotary movement are prevented.

In the above embodiment, although the second valve chamber 23 is divided into the first region 24, the second region 25, and the third region 26 in order from bottom to top according to the inner diameter, the order of the inner diameter may be different. For example, if the diameter is reduced in order from bottom to top, there is an advantage that the processing of the second valve chamber 23 is easy.

Second Embodiment

Figure 4A:
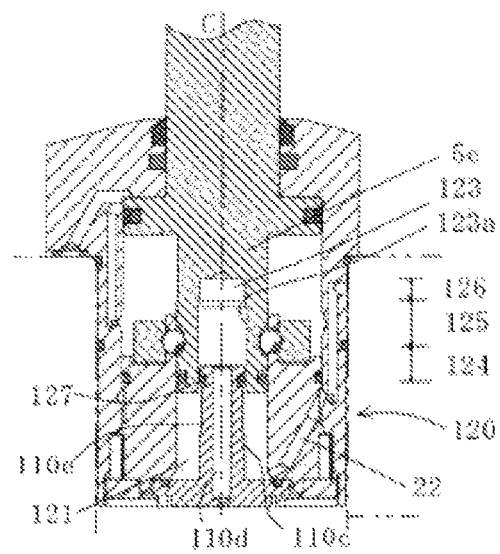
Figure 4B:
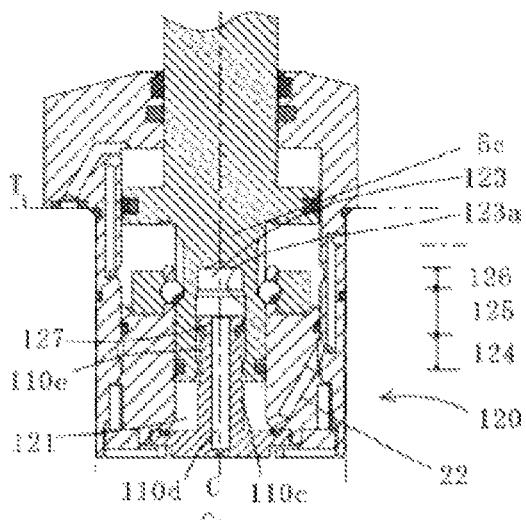
Figure 4C:
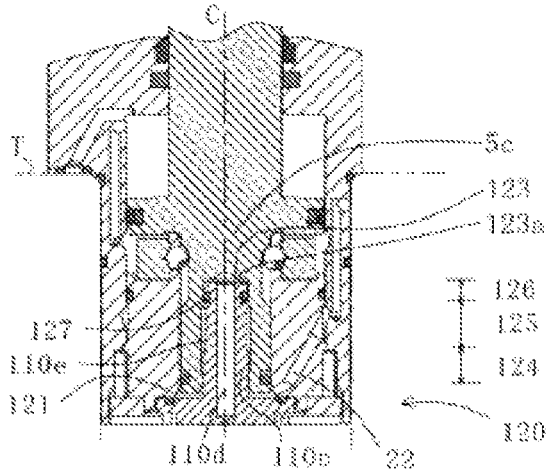

FIGS. 4A, 4B and 4C show another configuration example of a motion detection device 120. A second valve chamber 123 of the motion detection device 120 is divided into a first region 124, a second region 125, and a third region 126 in order from bottom to top by its inner diameter similarly to the second valve chamber 23 of the first embodiment. The second region 125 has the largest diameter, the third region 126 has the smallest diameter, and the first region 124 has an intermediate diameter. Other configurations are the same as in the first embodiment.

Next, the operation of the motion detection device 120 will be described. In the unclamp state of FIG. 4A, the compressed air in a first valve chamber 121 is guided to a valve rod passage 110d through a gap between a seal section 127 and the second valve chamber 123 in the first region 124. As shown in FIG. 4B, when the lower rod 5c descends and the seal section 127 reaches the second region 125, a gap between the first valve chamber 121 and the valve rod passage 110d becomes larger and the pressure loss is reduced compared to the case of the first region 124.

In the clamp state of FIG. 4C, although the seal section 127 has reached the third region 126, the gap between the seal section 127 and the second valve chamber 123 is closed. In this embodiment, the pressure detected by a pressure sensor (not shown) provided to the housing passage 22 is the highest when the position of the seal section 127 is in the third region 126, and the next is when the seal section 127 is present in the first region 124. When the seal section 127 is in the second region 125, the pressure detected by the pressure sensor becomes the lowest. In this embodiment, in the second region 125, since the seal section 127 does not contact with the inner peripheral wall 123a of the second valve chamber 123, the seal section 127 can be prevented from being slid while the output member 5 is descending.

Third Embodiment

Figure 5A:
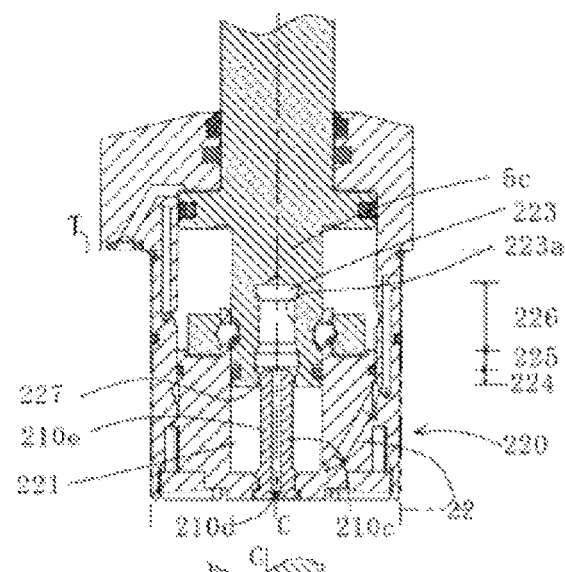
FIGS. 5A to 5C show a third embodiment of the present invention.
Figure 5B:
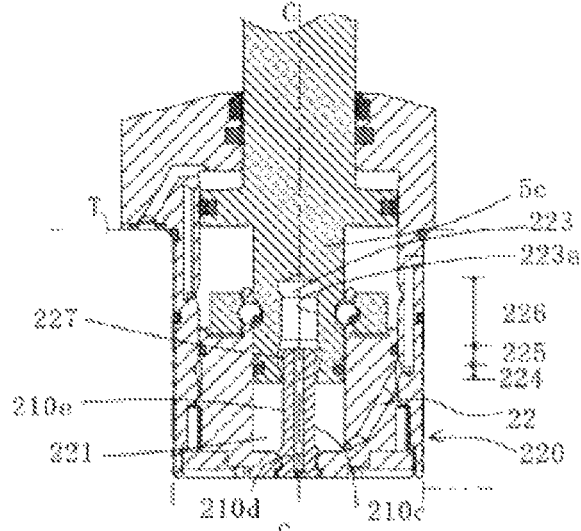
Figure 5C:
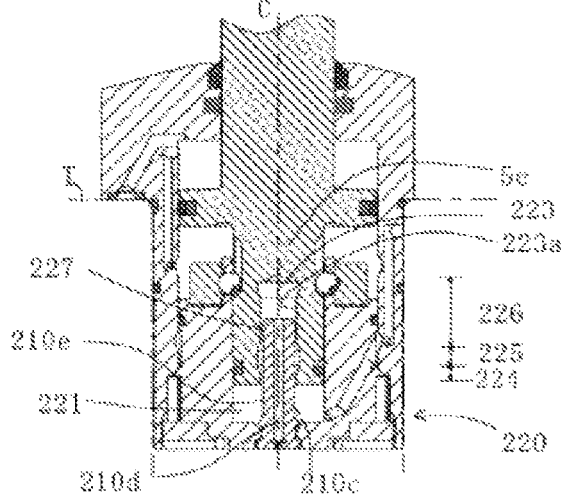

FIGS. 5A, 5B and 5C illustrate a configuration example of a motion detection device 220 according to the third embodiment. A second valve chamber 223 of the motion detection device 220 is divided into a first region 224, a second region 225, and a third region 226 in order from bottom to top by its inner diameter, similarly to the second valve chamber 123 of the second embodiment. The second region 225 has the largest diameter, the third region 226 has the smallest diameter, and the first region 224 has an intermediate diameter. On the other hand, a valve rod 210c is composed of an elastic body. The valve rod 210c has a seal section 227 with an enormous diameter around the top of the head, and therefore, the present example differs from the examples described so far in that the seal section 227 is not a separate member made from an O-ring. In the unclamp state shown in FIG. 5A, the compressed air in the first valve chamber 221 is guided to the valve rod passage 210d through a gap between the seal section 227 and the second valve chamber 223 in the first region 224. As shown in FIG. 5B, when the lower rod 5c descends and the seal section 227 reaches the second region 225, a gap between the inner peripheral wall 223a of the second valve chamber 223 and the valve rod 210c becomes larger and the pressure loss is reduced compared to the case of the first region 124.

In the clamp state shown in FIG. 5C, although the seal section 227 has reached the third region 226, the gap between the seal section 227 and the second valve chamber 223 is closed. In this embodiment, the pressure detected by the pressure sensor is the highest when the position of the seal section 227 is in the third region 226, and it becomes the second highest when the seal section 227 is in the first region 224. When the seal section 227 is in the second region 225, the pressure detected by the pressure sensor becomes the lowest.

Forth Embodiment

Figure 6A:
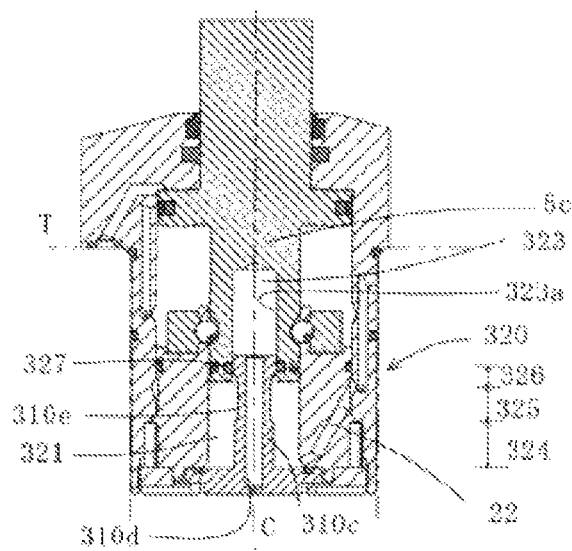
FIGS. 6A to 6C show a fourth embodiment of the present invention.
Figure 6B:
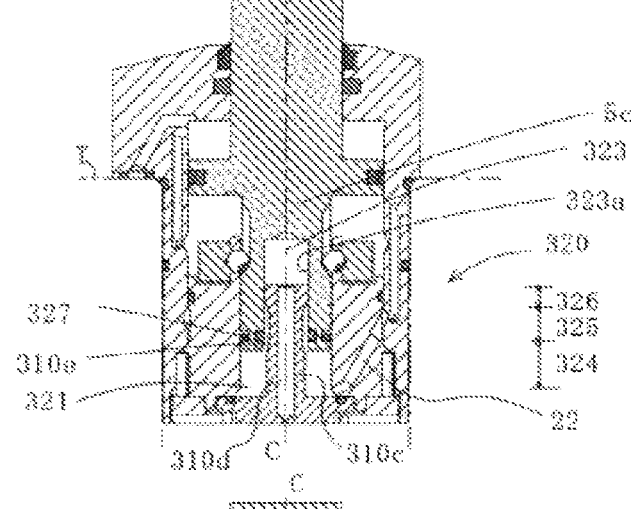
Figure 6C:
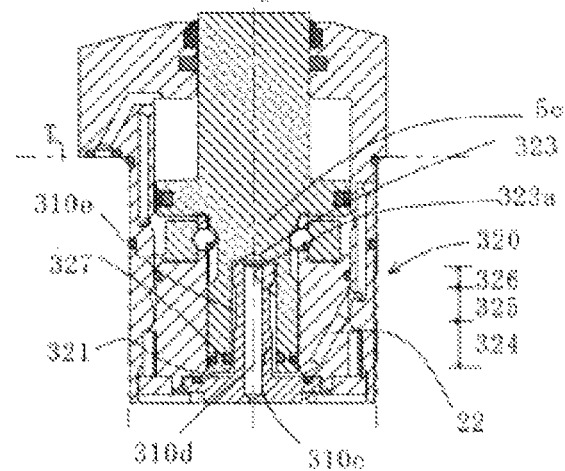

In the first embodiment, the second valve chamber 23 was divided into the first region 24, the second region 25, the third region 26, and the like in order from bottom to top according to its inner diameter, and the pressure loss was changed or the communication to the valve rod passage 10d was closed depending on the position of the seal section 27 of the valve rod 10c. In this embodiment, as shown in FIGS. 6A, 6B and 6C, the outer diameter on the valve rod 310c side is changed in three steps from the bottom, namely, a first region 324, a second region 325, and a third region 326. Here, the second region 325 has the smallest outer diameter, the third region 326 has the largest outer diameter, and the first region 324 has an intermediate outer diameter. A seal section 327 is provided on an inner peripheral wall 323a near the outlet on the second valve chamber 323 side.

In the unclamp state shown in FIG. 6A, a gap between the first valve chamber 321 and the second valve chamber 323 is closed by the third region 326 and the seal section 327. As shown in FIG. 6B, when the lower rod 5c descends and the seal section 327 reaches the second region 325, a gap is generated between the second valve chamber 323 and the valve rod 310c.

In the clamp state shown in FIG. 6C, the seal section 327 has reached the first region 324. A gap between the seal section 327 and the valve rod 310c is smaller than the second region 325. At the position of the second region 325, the gap with the seal section 327 may be referred to as a simple flow passage in relation to another passage, and it is the first region 324 that is referred to as a throttle passage. These have different cross sections of the gap, and pressure loss is smaller in the flow passage than in the throttle passage.

The shape of the inner peripheral wall 323a of the second valve chamber 323 and the shape of the outer peripheral wall 310e of the valve rod 310c may be designed with an outer diameter so that the pressure loss is different depending on the position of the lower rod 5c, or may be provided with the seal section 327 that shuts off the gap between the first valve chamber 321 and the rod passage 310d on the second valve chamber 323 side or the valve rod 310c side.

Fifth Embodiment

Figure 7A:
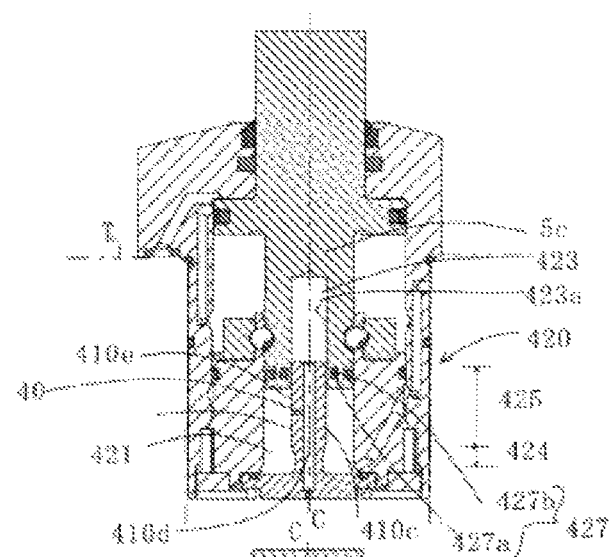
FIGS. 7A to 7C show a fifth embodiment of the present invention.
Figure 7B:
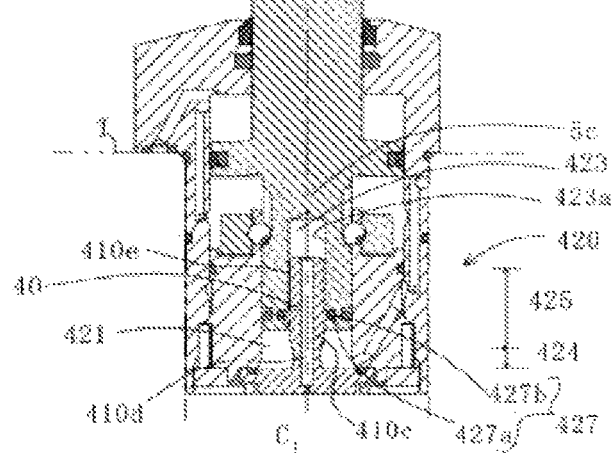
Figure 7C:
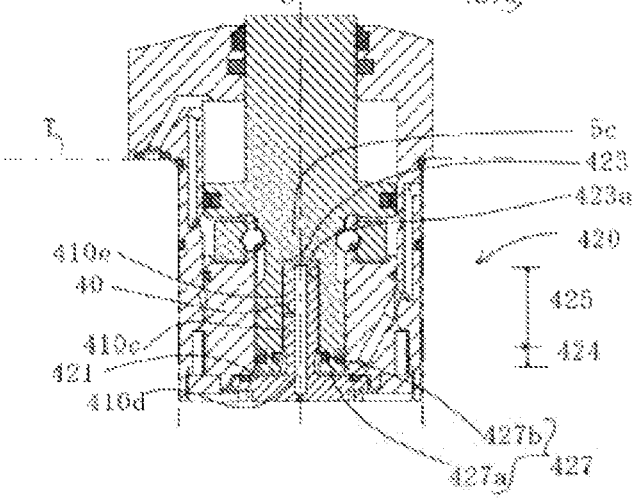

FIGS. 7A, 7B and 7C show a configuration example of the motion detection device according to the fifth embodiment.

Although the first embodiment is an example wherein regions having different cross sections of the gap were provided so as to generate different pressure losses when the compressed air passes through between the valve rod 10c and the second valve chamber 23 when the valve rod 10c and the second valve chamber 23 relatively move in a region where the closing by the seal section 27 is invalid, the present embodiment is an example wherein a bypass passage 40 leading from the first valve 421 to the valve rod passage 410d is provided in a region where the closing by the seal section 427 is effective, and a predetermined pressure loss due to the bypass passage 40 occurs in the upper and lower regions of the position where the bypass passage 40 is provided.

In the present embodiment, the valve rod 410c is divided into a first region 424 and a second region 425 by its outer diameter. The first region 424 has a smaller outer diameter than the second region 425, and a gap is formed between a seal section provided on an inner peripheral wall 423*a* side of a second valve chamber 423 and an outer periphery of a valve rod.

In the second region, an outer peripheral wall of a valve rod 410*c* contacts the seal section 427 provided on the inner peripheral wall 423*a* side of the second valve chamber 423. In the middle of the height of the second region, there is the bypass passage 40 penetrating or extending from the outer peripheral wall of the valve rod 410*c* to the valve rod passage 410*d*.

In the unclamp state shown in FIG. 7A, the seal section 427 provided on the inner peripheral wall of the second valve chamber 423 is located above the bypass passage 40 in the second region 425. Although the compressed air in the first valve chamber 421 is prevented from entering the second valve chamber 423 side by the seal section 427, the compressed air is guided to the valve rod passage 410*d* through the bypass passage 40. As shown in FIG. 7B, when the lower rod 5*c* descends and the seal section 427 reaches the second region 425 below the bypass passage 40, the first valve chamber 421 cannot be interconnected to the valve rod passage 410*d* through the bypass passage 40 to close between the first valve chamber 421 and the valve rod passage 410*d*.

In the clamp state shown in FIG. 7C, the seal section 427 reaches the first region 424. In the first region 424, the valve rod 410*c* is not in contact with the seal section 427, so that the sealing performance of the seal section 427 is invalidated, and the first valve chamber 421 and the second valve chamber 423 communicate through the gap between the outer peripheral wall 410*e* and the inner peripheral walls 423*a*. Further, since the outer diameter of the valve rod 410*c* in the second region 425 is smaller than the inner diameter of the second valve chamber 423, the compressed air in the first valve chamber 421 reaches the valve rod passage 410*d* opened at the top of the valve rod 410*c*. At this time, by setting the hole diameter of the bypass passage 40 so that the pressure loss from the first valve chamber 421 to the valve rod passage 410*d* is smaller than the pressure loss when passing through the bypass passage 40, the unclamp state in FIG. 7A and the clamp state in FIG. 7C can be distinguished by the detection value of a pressure sensor (not shown).

In this embodiment, although the seal section 427 slides on the bypass passage 40, since the hole diameter of the bypass passage 40 may be smaller than the opening for supplying the compressed air, the hole diameter of the bypass passage 40 has little effect on the performance of the seal section 427. Further, by inserting the spacer 427*b* on the side of the seal section 427 that is contact with the valve rod 410*c* as a double structure of an elastic body 427*a* and a spacer 427*b* with a low coefficient of friction, the effect on the performance of the seal section 427 is further reduced.

Sixth Embodiment

Figure 8A:
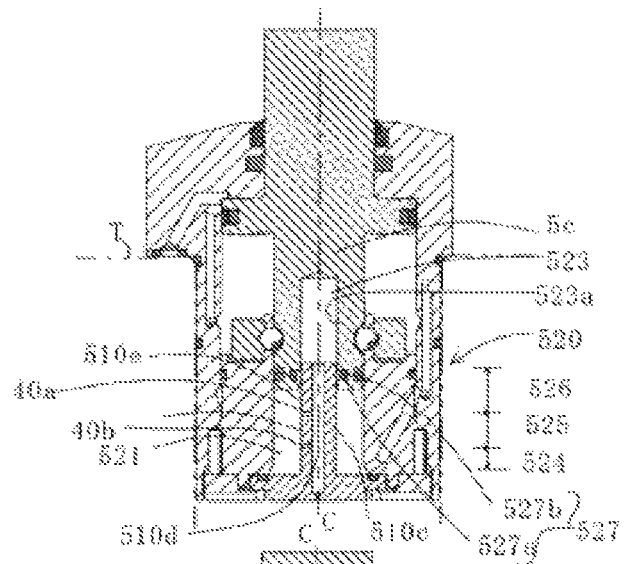
FIGS. 8A to 8C show a sixth embodiment of the present invention.
Figure 8B:
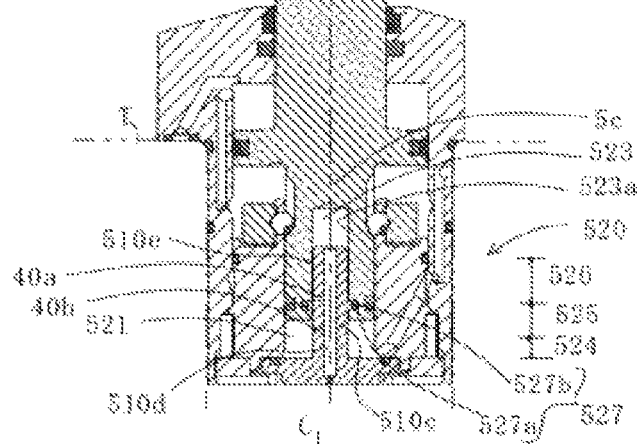
Figure 8C:
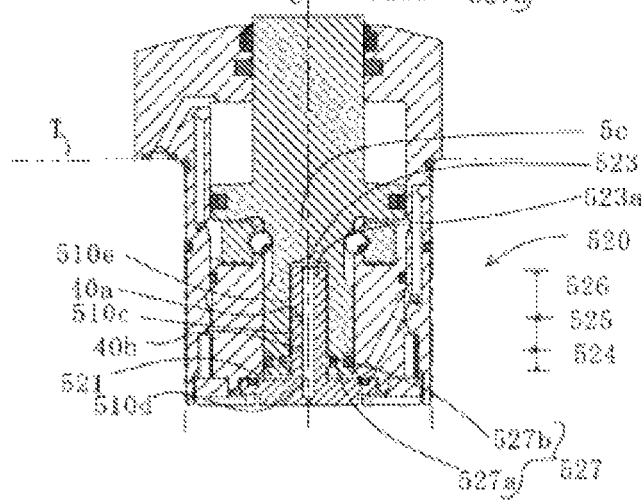

FIGS. 8A, 8B and 8C show a configuration example of a motion detection device 520 according to the sixth embodiment. In the sixth embodiment, a sheath chamber 523 in which the lower rod 5*c* is opened in a hollow shape downward along the axis C does not have a function as a valve chamber through which compressed air flows. The sheath chamber 523 provides a bag-shaped space in which a mere valve rod 510*c* can be inserted and compressed air cannot leak. On the other hand, the bypass passages 40*a*, 40*b* are provided so as to lead from the first valve chamber 521 to the valve rod passage 510*d*. The bypass passages 40*a*, 40*b* are set up and down, in which a predetermined pressure loss is caused by blocking all or one of the bypass passages 40*a*, 40*b* from the communication with the first valve chamber 521 at the position of the seal section 527 by the up and down movement of the lower rod 5*c*.

In this embodiment, the valve rod 510*c* is divided into a first region 524, a second region 525, and a third region 526 from bottom to top depending on the positions of the bypass passages 40*a*, 40*b*. The first region 524 is below the bypass passage 40*b*, the second region 525 is between the bypass passage 40*a* and the bypass passage 40*b*, and the second region 526 is above the bypass passage 40*a*. The bypass passages 40*a*, 40*b* penetrate from the outer peripheral wall of the valve rod 510*c* to the valve rod passage 510*d*. The seal section 527 is provided at the inlet of the sheath chamber 523 to block direct communication between the first valve chamber 521 and the sheath chamber 523. The seal section 527 has a double structure of an elastic body 527*a* and a spacer 527*b* with a low coefficient of friction.

In the unclamping state shown in FIG. 8A, the seal section 527 is located in a third region 526 above the bypass passage 40*a*. The compressed air in a first valve chamber 521 is guided to a valve rod passage 510*d* through the bypass passages 40*a*, 40*b*. As shown in FIG. 8B, when the lower rod 5*c* descends and the seal section 527 reaches the second region 525, the bypass passage 40*a* cannot communicate with the first valve chamber 521 and the valve rod passage 510*d*, and the communication state is established only by the bypass passage 40*b*.

In the clamp state shown in FIG. 8C, the seal section 527 reaches the first region 524. In the first region 524, neither of the bypass passages 40*a*, 40*b* can communicate with the first valve chamber 521 and the valve rod passage 510*d*. By providing the bypass passages 40*a*, 40*b* above and below in the valve rod 510*c*, the pressure loss is changed by changing the number of bypass passages 40*a*, 40*b* that communicate with the first valve chamber 521 and the valve rod passage 510*d*. This pressure change can be distinguished by a detection value of a pressure sensor (not shown). In the present embodiment, although there are two bypass passages 40*a*, 40*b*, a plurality of bypass passages may be provided. In the present embodiment, although the valve rod passage 510*d* provided in the length direction of the valve rod 510*c* opens toward the sheath chamber 523, if there is another passage that leads the air in the sheath chamber 523 to the outside air, there is no need to open the sheath chamber 523 because the valve rod passage 510*d* does not play the role. In the present embodiment, the cross section of the bypass passage 40*a* and the cross section of the bypass passage 40*b* may be the same or different.

Seventh Embodiment

Each of FIGS. 9, 10A, 10B and 10C shows a configuration example of a motion detection device 620 according to the seventh embodiment. The cylinder device shown in the seventh embodiment is applicable to both a push type cylinder and a pull type cylinder. In the fifth embodiment, the first valve chamber 421 is used as a passage of the compressed air. However, in the present embodiment, the compressed air does not go through a space 621 (corresponding to the first valve chamber of the previous embodiments) provided between the bottom 10*b* of the lower wall 1*b* and the undersurface 5*d* of the lower rod 5*c*. In this embodiment, two systems of a first valve rod passage 53 and a second valve rod passage 54 are provided in the valve rod 50, one of which is on the compressed air supply side and the other is on the discharge side.

Figure 9:
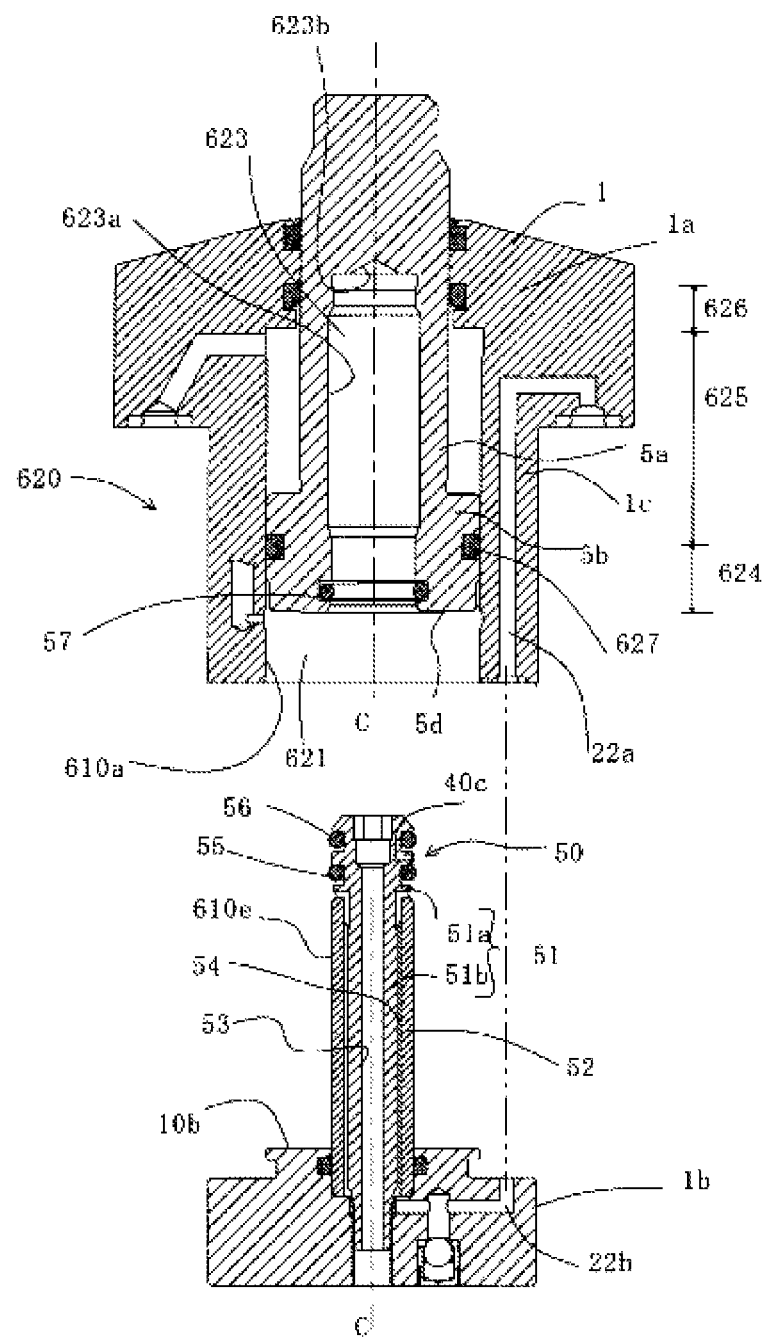
FIG. 9 is an exploded view of a cylinder device according to a seventh embodiment of the present invention.

FIG. 9 is an exploded view in which the lower wall 1b of the housing 1 is exploded from the upper wall 1a and the barrel wall 1c for ease of explanation. When the lower wall 1b is connected to the upper wall 1a and the barrel wall 1c, a housing passage 22a is connected to a housing passage 22b. A second valve chamber 623 is formed from the piston portion 5b and the rod body 5a constituting the output member 5. The second valve chamber 623 can be divided into a first region 624, a second region 625, and a third region 626 in order from bottom to top depending on the inner diameter. The diameter of the second region 625 is large, and the diameters of the first region 624 and the third region 626 are small.

A first valve rod passage 53 and a second valve rod passage 54 that open toward the second valve chamber 623 are provided coaxially on the valve rod 50 protruding from the lower wall 1b. The first valve rod passage 53 opens toward a bottom surface 623b of the second valve chamber 623, and the second valve rod passage 54 opens toward an inner peripheral wall 623a of the second valve chamber 623. The valve rod 50 has a double structure that the outer rod 52 inserts the inner rod 51, and a gap between the outer rod 52 and the inner rod 51 forms the second valve rod passage 54. A leading edge of the inner rod 51 is out of surrounding of the outer rod 52 and exposed in an enormous shape to form a head end 51a of the valve rod 50.

A pair of seal sections (O-rings) 55, 56 are provided around the head end 51a of the valve rod 50 so as to have different heights, respectively. Between the seal section 55 and the seal section 56, a bypass passage 40c penetrating from the first valve rod passage 53 toward the inner peripheral wall 623a of the second valve chamber is provided. A seal section 57 provided around the inlet of the second valve chamber 623 contacts on an outer peripheral wall 610 e of the outer rod 52 to seal the second valve chamber 623 from the space 621.

Figure 10A:
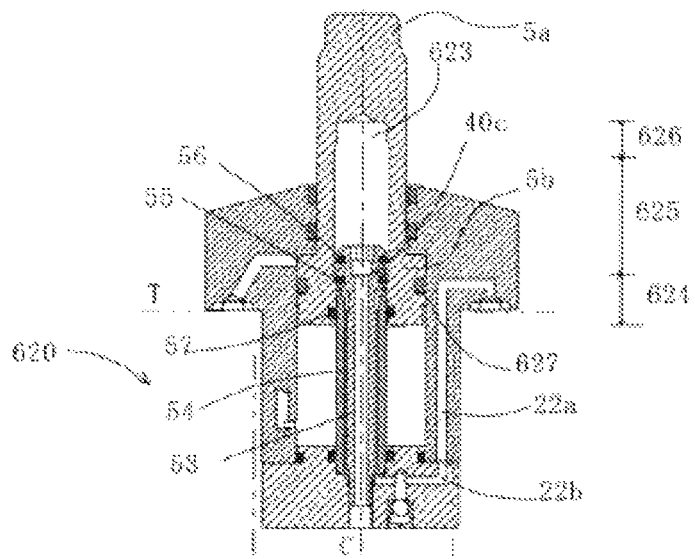
FIGS. 10A to 10C show the seventh embodiment of the present invention.
Figure 10B:
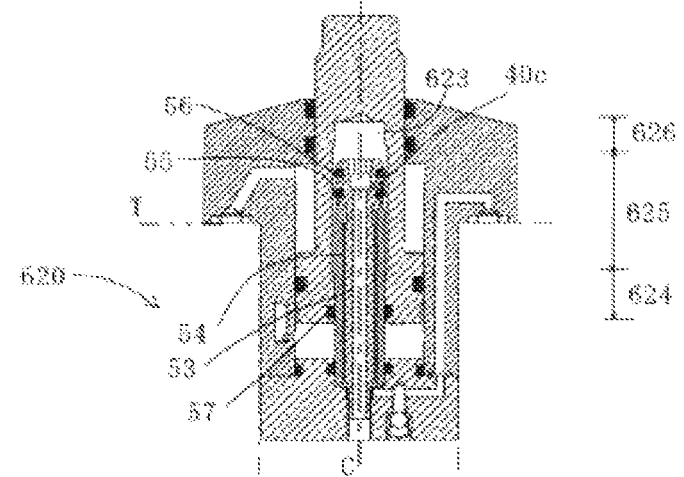
Figure 10C:
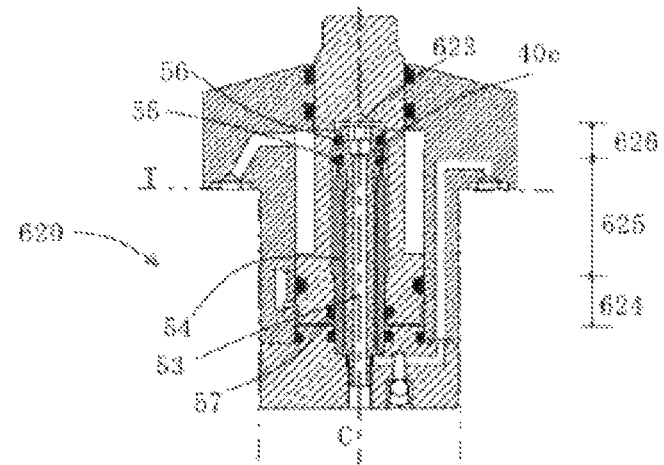

FIGS. 10A, 10B and 10C show a movement when the valve rod 50 and the second valve chamber 623 relatively move along the axis C. In an up-advance state of the output member 5 shown in FIG. 10A, the seal section 55 is located at a position corresponding to the first region 624, and the second valve rod passage 54 is prevented from communication with the second valve chamber 623 and the first valve rod passage 53 when the seal section 55 is blocked. In the state of the output member 5 in the middle of descending, which is shown in FIG. 10B, when the seal section 55 and the seal section 56 reach the second region 625, the second valve rod passage 54 leads to the valve chamber 623 side without being blocked by the seal sections 55, 56. Since the first valve rod passage 53 is open to the second valve chamber 623, the first valve rod passage 53 and the second valve rod passage 54 are in communication.

In the state of the descending and retreating output member 5 shown in FIG. 10C, the seal section 56 reaches the third region 626. In the third region 626, the second valve rod passage 54 is prevented from leading to the second valve chamber 623 by blocking the seal section 56. On the other hand, since the bypass passage 40c is located between the seal sections 55, 56 and not closed by the seal section 55, the first valve rod passage 53 and the second valve rod passage 54 are communicated by the bypass passage 40c in a state where the passage is throttled. The throttle of the bypass passage 40c causes a predetermined pressure loss. In this way, the close state is created in the first region 624, the communicating state is created in the second region 625, and the throttled state is created in the third area 626, and this pressure change can be distinguished by a detection valve of a pressure sensor (not shown).

In the present embodiment, when the bypass passage is not provided, the compressed air passage is blocked in the above-mentioned up-advance state or down-retreat state, and is opened halfway. In this case, the seal sections 55, 56 are not one pair, and only one of the seal sections 55, 56 may be provided.

Eighth Embodiment

Figure 11A:
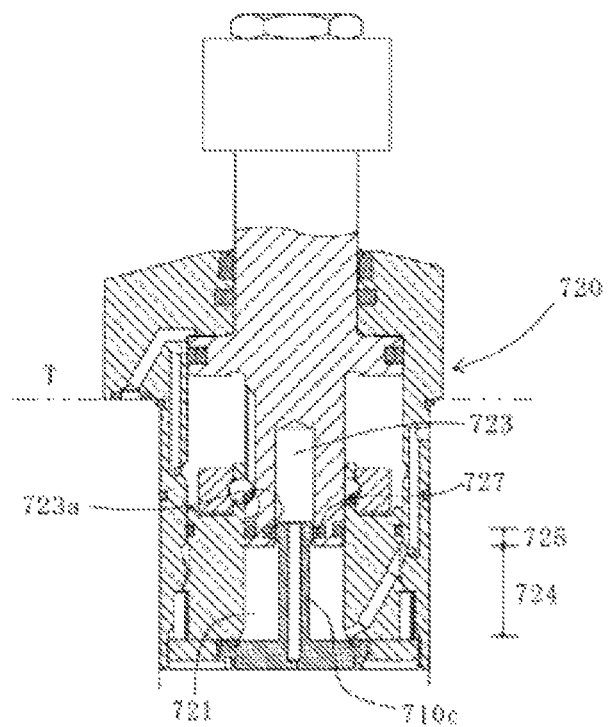
FIGS. 11A to 11B show an eighth embodiment of the present invention.
Figure 11B:
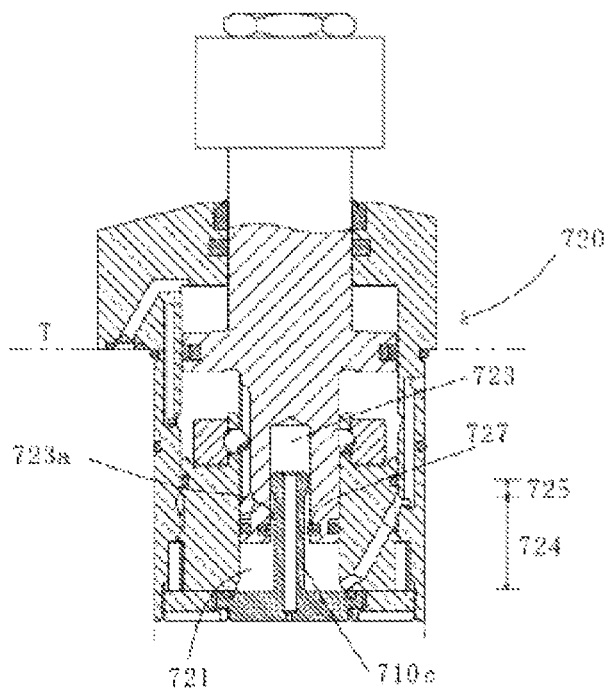

FIGS. 11A, 11B and 11C show a configuration example of a motion detection device 720 according to the eighth embodiment.

In this embodiment, when an outer diameter of a valve rod 710c side is changed in two steps from the bottom and a first region 724 and a second region 725 are respectively set, the outer diameter of the first region 724 is the smallest, and the second region 725 has the largest outer diameter. A seal section 727 is provided on an inner peripheral wall 723a near an outlet on a second valve chamber 723 side. The seal section 727 has a double structure including an elastic body and a spacer having a small friction coefficient.

In an extended state shown in FIG. 11A, a space between a first valve chamber 721 and the second valve chamber 723 is closed by the second region 725 and the seal section 727. As shown in FIG. 11B, when the lower rod 5c descends and the seal section 727 reaches the first region 724, a gap is generated between the second valve chamber 723 and the valve rod 710c. There is a gap between the second region 725 of the valve rod 710c and the second valve chamber 723, and the first valve chamber 721 and the second valve chamber are in communication.

Each embodiment and each modification can be further changed as follows. In the above embodiments, one end sides of the compressed air flow passages formed between the first valve chambers 21, 121, 221, 321, 421, 521 and the valve rod passages 10d, 110d, 210d, 310d, 410d, 510d side are on the first valve chamber 21, 121, 221, 321, 421, 521 sides, respectively, or vice versa. In the seventh embodiment, one of the first valve rod passage 53 and the second valve rod passage 54 may be set to one end of the compressed air flow passage, and the other may be set to the other end side. In the seventh embodiment, the first valve rod passage 53 and the second valve rod passage 54 are provided coaxially, but need not be coaxial. For example, the first valve rod passage 53 and the second valve rod passage 54 may be long holes formed in the inside of the valve rod 50 in the longitudinal direction, and these long holes may not be parallel.

In the above embodiments, the output member 5 may be turned in the counterclockwise direction in plane view instead of turning in the clockwise direction in plane view in driving the clamp. Further, it is needless to say that the turning angle of the output member 5 can be set to a desired angle such as 90 degrees. Although the output member 5 has the piston portion 5b integrally, as disclosed in the patent literature 1, the piston portion 5b may be provided separately and may be configured to move up and down so as not to follow the turning movement of the output member 5.

Further, the guide groove 12 is constituted by the illustrated spiral rotary groove 13 and the straight rectilinear groove 14, but the rectilinear groove 14 may be omitted. Further, although the double-acting type for supplying the pressurized fluid to the unclamp chamber and the clamp chamber is shown, a single-acting type may be used instead.

In addition, although the output member is driven by the pressure fluid, it may be an electric actuator. In addition, it goes without saying that various changes can be made within a range that can be assumed by those skilled in the art.

In each embodiment, instead of providing a pressure sensor for measuring the pressure in the passage on the side where the compressed air enters (for example, on the housing passage 22 side), the pressure sensor may be provided on the side where the compressed air exits (for example, on the valve rod passage 10d side).

DESCRIPTION OF SYMBOLS 1 housing
1a upper wall
1b lower wall
1c barrel wall
2 cylinder hole
3 cylindrical hole
5 output member
5a rod body
5b piston portion
5c lower rod
5d undersurface
6 arm
10 support cylinder
10a cylinder hole
10b bottom
10c, 110c, 210c, 310c, 410c, 510c, 710c valve rod
10d, 110d, 210d, 310d, 410d, 510d valve rod passage
10e, 110e, 210e, 310e, 410e, 510e, 610e outer peripheral wall
11 rotary mechanism
12 guide groove
13 rotary groove
14 rectilinear groove
15 ball
16 supporting hole
17 sleeve
18 V-shaped groove
19 pin
20, 120, 220, 320, 420, 520, 620, 720 motion detection device
21, 121, 221, 321, 421, 521, 721 first valve chamber
22, 22a, 22b housing passage
23, 123, 223, 323, 423, 623, 723 second valve chamber
23a, 123a, 223a, 323a, 423a, 523a, 623a, 723a inner peripheral wall
24, 124, 224, 324, 424, 524, 624, 724 first region
25, 125, 225, 325, 425, 525, 625, 725 second region
26, 126, 226, 326, 526, 626 third region
27, 127, 227, 327, 427, 527, 727 seal section
28 throttle passage
29 flow passage
30 clamp chamber
31 unclamp chamber
32, 33 discharge path
40, 40a, 40b, 40c bypath passage
50 valve rod
51 inner rod
51a head end
52 outer rod
53 first valve rod passage
54 second valve rod passage
55, 56, 57 seal section
427a, 527a elastic body
427b, 527b spacer
523 sheath chamber
621 space
623a inner peripheral wall
623b bottom surface
C axis
T table

The invention claimed is:

1. A cylinder having an output member accommodated in a cylinder hole provided in a housing and moveable up and down in the cylinder hole by a pressurized fluid, comprising:
a first valve chamber provided between a lower wall of the housing and the output member;
a second valve chamber being a hollowed out portion of the output member so as to be open toward the first valve chamber;
a valve rod protruding from the lower wall and configured to be inserted into the second valve chamber,
said valve rod comprising:
a valve rod passage being open toward the second valve chamber; and
a seal section provided on an outer peripheral wall side of the valve rod or an inner peripheral wall side of the second valve chamber between the valve rod and the second valve chamber,
wherein a compressed air flow passage formed between the first valve chamber and the second valve chamber is configured so as to have a closed region sealed by the seal section when the valve rod is in at least a first position in which a fluid cannot pass between the first valve chamber and the second valve chamber and to have an open region free of sealing by the seal section when the valve rod is in a at least second position in which the first valve chamber and the second valve chamber are in fluid communication,
wherein compressed air is supplied from one end of the compressed air flow passage, and another end of the compressed air flow passage is open to an outside air.

2. The cylinder according to claim 1, wherein the open region free from sealing includes segments each having a different cross-sectional area of a gap provided between the valve rod and the second valve chamber so as to cause different pressure losses when compressed air passes through the gap when the valve rod and the second valve chamber move relative to each other.

3. The cylinder according to claim 1, wherein a bypass passage connecting the first valve chamber and the valve rod passage is provided for the closed region to be sealed, and a predetermined pressure loss by the bypass passage occurs on a region above and below a position where the bypass passage is provided.

4. A cylinder having an output member accommodated in a cylinder hole provided in a housing moveable up and down in the cylinder hole by a pressurized fluid, comprising:
a first valve chamber provided between a lower wall of the housing and the output member;
a sheath chamber being a hollowed out portion of the output member so as to be open toward the first valve chamber;
a valve rod protruding from the lower wall and configured to be inserted into the sheath chamber,
said valve rod comprising:
a valve rod passage provided in a length direction of the valve rod;
a seal section provided on an outer peripheral wall side of the valve rod or an inner peripheral wall side of the sheath chamber; and a plurality of bypass passages connecting the first valve chamber and the valve rod passage, one bypass passage being spaced from at least one other bypass passage, wherein a predetermined pressure loss by the plurality of bypass passages occurs when the valve rod and the sheath chamber move relative to each other.

5. A cylinder having an output member accommodated in a cylinder hole provided in a housing and moveable up and down in the cylinder hole by a pressurized fluid, comprising:

a valve rod protruding from a lower wall of the housing;

a second valve chamber being a hollowed out portion of the output member so as to receive the valve rod, said valve rod comprising:

a first valve rod passage and a second valve rod passage each being open toward the second valve chamber; and a pair of seal sections being operably associated with the valve rod and the second valve chamber;

wherein a compressed air flow passage formed between the first valve rod passage and the second valve rod passage is configured so as to have a closed region sealed by the pair of seal sections when the valve rod is in a first position and to have an open region free of sealing by the pair of sealing sections when the valve rod is in a second position, wherein compressed air is supplied from one end of the compressed air flow passage and another end of the compressed air flow passage is open to an outside air.

6. The cylinder according to claim 5, wherein the valve rod further includes a bypass passage extending from the first valve rod passage toward the inner peripheral wall of the second valve chamber, the pair of seal sections includes one seal section provided above the bypass passage and another seal section provided below the bypass passage, and there is a region where a predetermined pressure loss occurs due to the bypass passage when the valve rod and the second valve chamber move relative to each other.

\* \* \* \* \*